March 7, 1967 K. W. McLOAD 3,308,425
DEPTH SENSITIVE TRANSDUCER
Filed Sept. 3, 1965
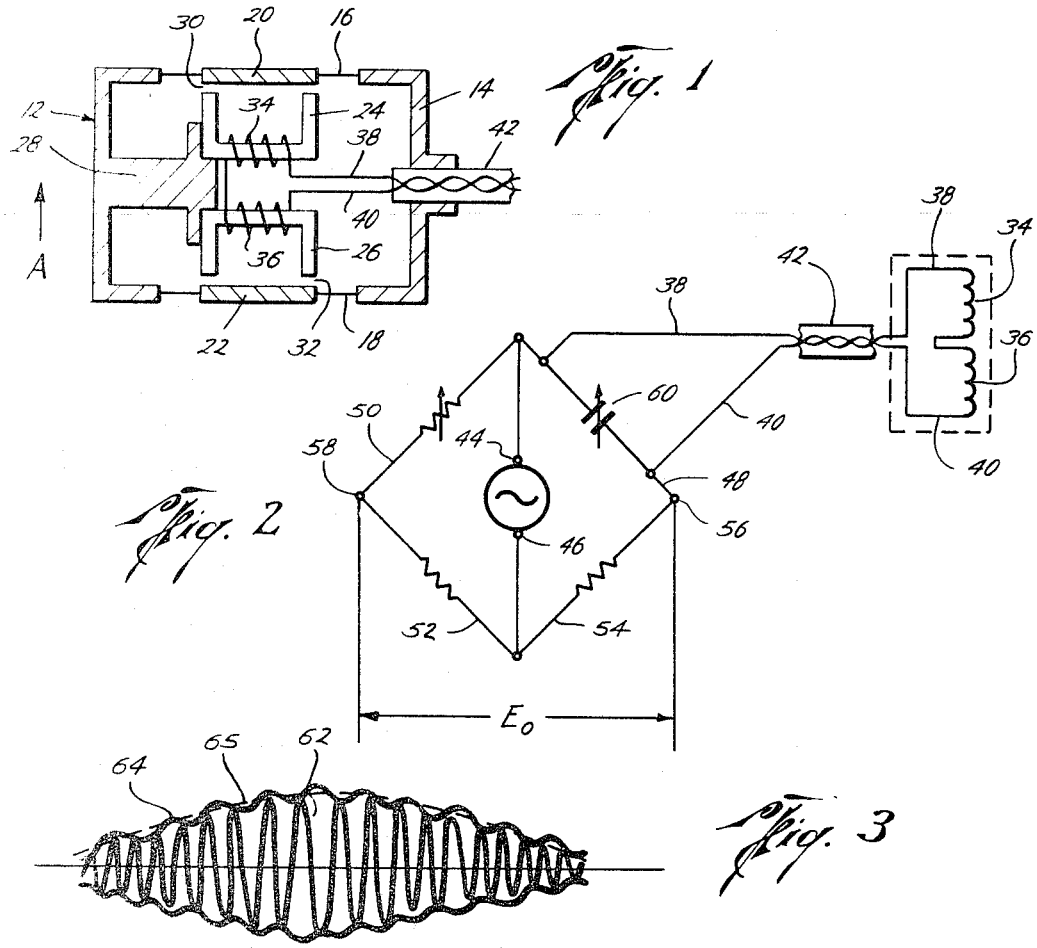
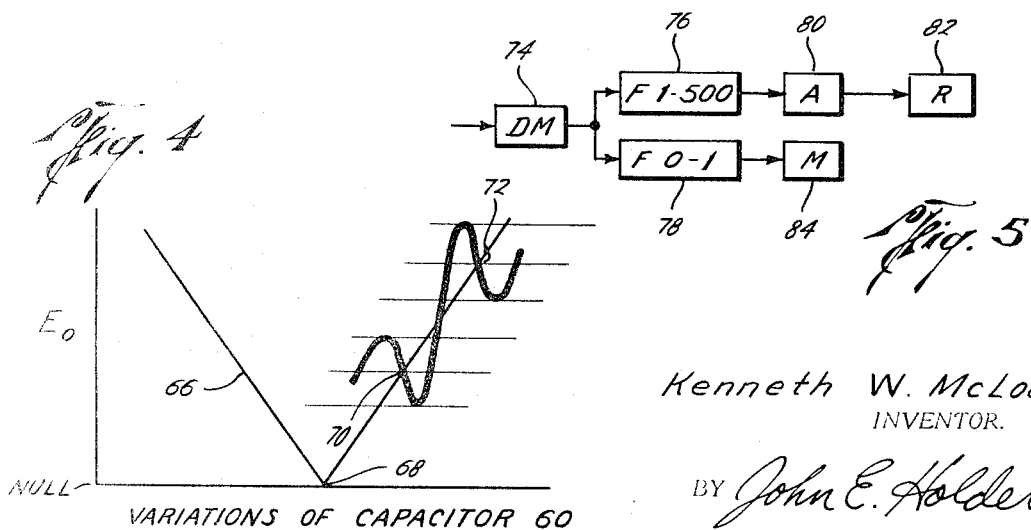
VARIATIONS OF CAPACITOR 60
Kenneth W. McLoad
INVENTOR.
BY John E. Holder
ATTORNEY

12

United States Patent Office 3,308,425
Patented Mar. 7, 1967

3,308,425
DEPTH SENSITIVE TRANSDUCER
Kenneth W. McLoad, Houston, Tex., assignor to Vector Cable Company, Houston, Tex., a corporation of Texas
Filed Sept. 3, 1965, Ser. No. 484,876
10 Claims. (Cl. 340—17)

This invention relates to a pressure transducer, and, more particularly, to a pressure transducer for measuring subaqueous ambient and acoustical pressure changes.

In order to obtain seismograph data on earth formations covered by bodies of water, it is necessary to place seismic detectors in the body of water and record seismic waves reflected from such subsurface formations. Detectors positioned at or near the surface of the water are subject to noise disturbances from the action of waves. Detectors located beneath the surfaec of the water are less susceptible to such wave action and therefore provide more accurate records of seismic wave reflections. Upwardly moving seismic waves which have been reflected from subsurface formations are also reflected from the surface of the water or, more particularly, the interface between the water and air. The air being less dense than the water, the seismic waves are inverted and reflected back to the detector located beneath the surface. It is readily seen that such inverted and reflected waves may interfere with or cancel upward moving incident waves impinging upon the detectors. It has been found that by locating the detectors at a depth corresponding with the one quarter wave length of seismic waves, such reflected waves are in phase with the incident waves. This results in less interference in the detection to produce greater fidelity in the seismograph recording. Since wave lengths in the range of 30–50 cycles per second carry the most useful seismic data, a corresponding depth of detectors of from 25 to 45 feet below the surface (representing a quarter wave length depth) has been found to provide the most effective position of detectors for recording pertinent seismic data.

Since the depth of the detectors is important, it is therefore desirable to know the exact depth of each detector at all times. One method of determining the depth of each detector or receptor involves the placement of a depth measuring device such as a pressure transducer near individual detectors or groups of detetcors. These transducers are designed to provide an electrical signal varying with ambient hydrostatic pressure and therefore depth. Each such depth responsive device requires a separate electrical circuit to transmit the depth information to the surface. In order to place a depth responsive transducer in association with each detector, an equal number of associated electrical circuits and conductors are required to provide appropriate electrical signals to a recording boat thereby greatly increasing the cost and complexity of constructing such a seismic system.

A preferred solution to this problem is to use seismic receptors which have an electrical output varying in response to seismically generated acoustical wave pressures and also exhibiting an electrical parameter which varies predictably with ambient hydrostatic pressure. Seismic detectors commonly provide an electrical output responsive to acoustical wave pressures, which output is recorded for later analysis. This electrical output may be produced by a number of transducer means such as piezoelectric or electromagnetic induction devices. Heretofore, however, such devices have not been capable of providing a usable signal indicative of both ambient hydrostatic pressure and acoustical seismic waves. With the use of larger detector arrays, the development of a single detector to provide a signal indicative of ambient and acoustical pressure changes has become essential to the continued improvement of such detector systems. Furthermore, a single detector used for these two purposes should generate a minimum of signal output as a result of motions or accelerations it may experience as it is carried through the water during a seismic survey.

The need therefore has existed for a seismic detector which is capable of producing a single signal representative of ambient hydrostatic pressure and reflected seismic waves. Such signal should be capable of transmission over a pair of conductors to equipment for recording the acoustical wave signals and also to equipment for analyzing the hydrostatic pressure dependent parameter of the signal so that the thus known depth of each detector may be utilized for making corrections in the position of the detectors or possibly for making time corrections in the seismic recording to compensate for changes in depth.

Heretofore, underwater detectors which were capable of producing information indicative of depth and seismic reflections over a single pair of conductors have also been sensitive to the motion of the detector in the water. Since the underwater environment of such detectors is constantly in a state of motion, information from such detectors is of little value.

It is therefore an object of the present invention to provide a new and improved seismic detector having a single output signal indicative of acoustical wave reflections and ambient hydrostatic pressure and more particularly to such a detector which produces a signal that is substantially unaffected by the motion of the detector in the water.

With this and other objects in view, the present invention includes an underwater transducer apparatus which is sensitive to ambient changes in pressure as well as to acoustical seismic waves. An electrical signal is provided from such apparatus carrying information indicative of changes in hydrostatic pressure and also indicative of acoustical waves. This information is transmitted via a single electrical circuit to a device for receiving such an electrical signal and for detecting and recording separately the information indicative of hydrostatic pressure and acoustical waves.

A complete understanding of this invention may be had by reference to the following detailed description when read in conjunction with the accompanying drawings illustrating embodiments thereof, wherein:

FIG. 1 shows a detector apparatus embodying the principles of the present invention;

FIG. 2 shows a bridge circuit for use in the detector system of the present invention;

FIG. 3 is a diagrammatic representation of an electrical signal emanating from the bridge circuit of FIG. 2;

FIG. 4 is a diagrammatic representation of an electrical signal carrying information indicative of two separate physical parameters measured by the detector; and FIG. 5 is a block diagram of a circuit for detecting and separating the information carried by the signal shown in FIGS. 3 and 4.

FIGURE 1 shows a variable inductance, variable reluctance detector 12 having an astatic configuration. The detector includes a water tight housing 14 with two of its surfaces on opposed sides of the housing having compliant diaphragms 16 and 18 comprising a portion of the wall of said housing 14. The diaphragms 16 and 18 are movable in response to pressure changes in the environment in which the detector is located. Armatures 20 and 22 are attached to the diaphragms 16 and 18 respectively, the armatures moving with the diaphragms in response to pressure changes. A pair of U-shaped pole pieces 24 and 26 are immovably secured to the housing 14 by means of a bracket 28. The pole pieces and armatures are constructed of magnetic material such as iron or steel. The parallel arms of the U-shaped pole pieces are positioned relative to the armatures 20 and 22 to provide spaces or air gaps 30, 32, respectively, between the armatures 20 and 22 and the pole pieces 24, 26. The pole pieces 24 and 26 are provided with windings 34 and 36, respectively, which windings are interconnected and lead to conductor wires 38 and 40. These conductor wires extend from a cable 42 which passes through a sealed opening in the housing 14 to maintain the interior of the housing fluid tight.

FIGURE 2 of the drawings shows a wiring diagram of a bridge circuit for use in conjunction with the apparatus of FIG. 1. The bridge circuit is excited at the terminals 44 and 46 by an A.C. signal of, for example, 1000 cycles per second. The conductor wires 38, 40, which emanate from the detector, are carried by the cable 42 and connected into arm 48 of the bridge. Arm 50 of the bridge is shown having a variable resistance while arms 52, 54 are provided with resistors of equal value. A signal taken from terminals 58, 56 of the bridge is indicative of imbalances in the bridge network due to variations in a reactance of the arm 48 and the resistance of arm 50. A variable capacitor 60 is shown in the arm 48 in parallel with the output of windings 34 and 36 in the detector. By varying the value of capacitor 60, the output $E_o$ across terminals 56, 58 may be reduced to a null as will be hereinafter described. A slight imbalance away from the null produces a situation in which the bridge circuit functions as a modulator, that is, the A.C. output $E_o$ is modulated or varied by the changes in inductance of coils 34 and 36 in response to changes in pressure on diaphragms 16 and 18. Such a modulated output is diagrammatically shown in FIG. 3 of the drawings, the varying envelop 64 about the A.C. carrier output resulting from such changes in pressure on the diaphragm.

In the operation of this device, a seismic streamer including a plurality of transducers of the present construction is towed behind a recording boat. Conductors from each of the transducers are carried through the streamer and a tow line to the recording boat. Acoustical waves are generated by some device such as an explosive apparatus which waves are reflected from earth formations below the body of water. These reflected waves are received by the transducers in the form of pressure waves which cause diaphragms 16, 18 to flex in accordance with the pressure waves. In the apparatus shown in FIG. 1, an acoustical compressional wave impinging upon the transducer device will simultaneously cause the diaphragms 16 and 18 to move inwardly toward the center of the transducer thereby moving the armatures 20 and 22 toward pole pieces 24 and 26. This movement of the armatures toward the pole pieces decreases the air gaps 30, 32 to increase the reactance in windings 34, 36, the reactance of the windings being a function of the reluctance in the magnetic circuit formed by the pole pieces and armatures. It can also be seen that changes in hydrostatic pressures due to variations in the depth of the transducer device in the water will also cause deflections of the diaphragms 16 and 18 but at a much lower frequency, for example, at much less than one cycle per second frequency. These changes in hydrostatic pressure will also change the inductance of the windings 34 and 36 as described above but at a much lower rate than the changes in inductance resulting from seismic waves.

The transducer windings 34 and 36 are shown in FIG. 2 for purposes of illustration. It is realized, of course, that these windings are in the transducer itself and therefore located at some remote point from the bridge circuit which would be located on a recording boat. The bridge circuit is excited at the terminals 44 and 46 by an alternating current signal of, for example, 1000 cycles per second. This alternating current is carried through the circuit path including the coils 34 and 36 in the transducer. Therefore, when a change in the inductive reactance of coils 34 and 36 is caused by movement of the armatures 20 and 22, such changes in reactance serve to modulate the 1000 cycle signal. The resulting modulated signal will carry information indicative of seismic waves reflected from earth formations and also information indicative of the hydrostatic pressure of the surrounding medium or depth of the transducer.

The wave form shown in FIG. 3 is representative of the modulated 1000 cycle carrier including this information. The carrier frequency is indicated by the reference numeral 62. The more frequent modulations of the carrier signal as indicated at 64 are representative of changes in reactance of coils 34, 36 caused by seismic waves. A change in depth of the transducer is indicated by a much lesser frequency modulation of the carrier which shows up as a gradual rise and fall of the overall amplitude of the modulated wave as represented by the dotted line 65.

Referring again to FIG. 2, that portion of the bridge circuit which is carried by the transducer is enclosed in dotted lines. In the operation of this system, the reactance of the transducer is connected into the arm 48 of the bridge circuit in parallel with a variable capacitor 60. The value of capacitor 60 is adjusted to cancel out the inductive reactance of the coils 34, 36 thus leaving the resistance of the L.C. circuit in arm 48 as the only impedance in that arm. By adjusting the variable resistor in arm 50, the impedance in arms 50 and 48 may be balanced to reduce the output $E_o$ to a null. This operation is graphically represented in FIG. 4 where line 66 represents the average amplitude of the output of $E_o$. At point 68 on the graph this output is shown to be at a null level. This null level provides a reference point from which to measure the average amplitude of the signal so that changes from this null level may be equated to the depth of the transducer. After the bridge circuit is nulled, subsequent changes in ambient or hydrostatic pressure will cause changes in the inductance of the coils 34 and 36 thereby unbalancing the bridge and causing the output $E_o$ to vary in amplitude away from the null point 68 as at 70 and 72 in FIG. 4. This change in the amplitude of the signal from point 70 to point 72 is shown as being abrupt in order to illustrate the significance of such changes. It will be appreciated that changes in ambient pressure due to changes in depth of the transducer in the water will tend to be more gradual and at a much lower frequency, thereby permitting the filtering of such information from the composite wave form in discrimination of information indicative of seismic waves.

FIG. 5 shows a block diagram of a circuit for reducing the information at $E_o$ to parameters indicative of the desired information to be derived from the transducer signal. The signal $E_o$ is fed to a demodulator 74 which removes the carrier frequency from the signal and provides a rectified signal to the filters 76 and 78. Filter 76 represents a high pass filter for selecting frequencies in the range of, say, 1500 cycles per second, which are in the range of seismic wave variations. The signal from filter 76 is amplified at 80 and then fed to a recorder 82 or other such device for placing the seismic information in useful form. At the same time, filter 78 detects those changes in the signal from demodulator 74 which occur at a rate of less than one cycle per second, which variations are due to the changes in ambient pressure at the transducer. This information is fed to a D.C. meter 84 for providing visual indications of changes in the depth of the transducer. This will enable the operator of the towing vessel to make necessary changes in the system to adjust the depth of the transducer to the desired level. The information received at meter 84 might also be recorded or otherwise used to correct for time displacement in seismic signals received at the individual transducers. In this event, the signal from filter 78 might also be amplified and fed to recorder 82 or a separate recorder for making corrections in the record of seismic signals.

An alternative transducer apparatus may be provided by utilizing permanent magnet armatures 20, 22 and pole pieces 24, 26 in the transducer 12. In such an apparatus, pressure variations impinging on the transducer would change the air gaps 30 and 32 as described above with reference to FIG. 1. Such changes in the air gaps will correspondingly cause changes in the magnetic field formed by the permanently magnetized armatures and pole pieces thereby inducing a current in wires 38, 40, the magnitude of which is representative of the magnitude of pressure variations affecting the diaphragms 16 and 118. These changes in induced current are compatible with the bridge modulator functions previously described. Therefore, the self generated signal which is representative of seismic waves does not impair the facility of the transducer to measure the depth thereof by modulating a carrier signal with changes in inductance as described above. The latter described mode of operation would have an advantage in that irregularities in the amplitude or frequency of the carrier signal would not be reflected in the recordings of the seismic waves received from the transducer. On the other hand, information indicative of slowly changing ambient pressure would not for all practical purposes be affected by such irregularities in the carrier signal.

An alternative embodiment of the apparatus shown in FIG. 1 is provided by the use of capacitors or resistors in place of the inductive reactance device shown in FIG. 1. For example, one plate of a capacitor would be fixedly secured to the bracket 28 while another plate would be mounted on the movable diaphragm. Pressure changes impinging on the transducer would vary the distance between the plates and thereby vary the capacitive reactance of the circuit in which the capacitor is positioned to modulate a carrier signal heretofore described. As in FIG. 1, a second capacitor, similarly arranged would react to pressures impinging on the opposite wall of the transducer.

In a similar manner, resistive elements may be mounted on the bracket 28 with a wiper arm connected to the diaphragms to vary the impedance of a circuit in response to pressure changes on the diaphragms.

It can be readily understood that the above-described functions of the transducer would be inherent in only one set of elements such as diaphragm 16, armature 20, pole piece 24, and coil 34. These elements would function in the manner described to produce a change in inductance of the single coil 34 in response to pressure changes impinging on diaphragm 16. However, let us assume that the transducer containing such a single set of the elements just described is accelerated in the direction A (FIG. 1) as by a wave motion or the like. The result would be that the air gap 30 would be reduced thereby generating a single or modulating a carrier signal in response to such motion irrespective of pressure changes caused by seismic waves or ambient pressure of the surrounding medium.

By providing dual elements as in FIG. 1, such motion sensitivity is nullified so that a motion of the transducer in the direction A will decrease the air gap 30 but, at the same time, will increase the air gap 32. The result is that when the coils 34 and 36 are properly interconnected, the resulting changes of impedance cancel one another and the output signal carried by wires 38 and 40 is not affected by the motion of the transducer in the surrounding medium. The use of dual elements in the transducer to produce cancelling signal variations is equally pertinent to the alternative embodiments utilizing capacitors and resistors.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. A pressure transducer comprising: a housing, pressure responsive means in said housing for providing an electrical signal indicative of hydrostatic pressure in the medium surrounding said housing, and electrical circuit means for correcting said signal to cancel out the effects of motion of said housing in said medium.

2. The apparatus of claim 1 wherein said pressure responsive means also provides a signal indicative of seismic pressure wave variations in said medium.

3. In a transducer for relating subaqueous pressure signals to electrical signals in the range of 0–500 c.p.s.; a housing, transducer means including a pair of transducive elements mounted on said housing, each of said elements being responsive to subaqueous ambient and seismic pressure changes, said transducer means including electrical circuit means, means associated with said transducive elements for modulating an electrical signal passing through said circuit means in a manner indicative of ambient and seismic pressure changes in the medium surrounding said housing, and means affecting said circuit for rendering said modulated signal substantially unaffected by pressure caused from the motion of said housing in said medium.

4. A pressure transducer system comprising: a housing, and transducer means mounted on said housing, said transducer means being responsive to subaqueous variations in ambient pressure and seismic pressure waves, said transducer means including electrical circuit means and a pair of pressure responsive means for producing changes in the impedance of said electrical circuit means to modulate an electrical signal passing through said circuit means in a manner indicative of said ambient and seismic pressure changes in the medium surrounding said housing, each of said pressure responsive means having an element movable in response to pressure changes for producing said changes in the impedance of said circuit means, said movable elements providing means for cancelling changes in the impedance of said circuit means when said pressure changes are a result of the motion of said housing in said medium.

5. A pressure transducer comprising: a fluid tight housing, and transducer means in said housing, said transducer means including coil means in a circuit, magnetic means mounted adjacent to said coil and arranged to move relative to said coil for inducing a current in said coil upon movement of said magnetic means, said magnetic means being arranged to move in response to pressure changes in the environment surrounding said transducer to thereby produce a signal in said circuit indicative of such pressure changes, said transducer means including circuit means for cancelling out any changes in said induced signal which result from the motion of said housing in the surrounding environment thereby rendering said signal substantially solely indicative of such environmental pressure changes.

6. A pressure transducer comprising: a fluid tight housing, pressure responsive means in said housing, means for deriving an electrical signal from said pressure responsive means which is substantially solely indicative of hydrostatic pressure changes in the medium surrounding said housing and of seismic pressure wave variations in said medium, said signal derived from said pressure responsive means being substantially unaffected by the motion of said housing in said medium, and means for detecting and distinguishing between a portion of said signal indicative of hydrostatic pressure and a portion of said signal indicative of seismic pressure wave variations.

7. A pressure transducer for underwater use comprising: a fluid tight housing, pressure responsive means on said housing for providing an electrical signal indicative of the hydrostatic pressure of the medium surrounding said housing and also indicative of acoustical pressure variations in said medium, said signal provided by said pressure responsive means being substantially unaffected by pressure due to motion of said housing in said medium, circuit means for balancing a measurable parameter of said electrical signal to provide a nulled reference point from which to measure the hydrostatic pressure of said medium surrounding said housing, and means for detecting and distinguishing between a portion of said signal indicative of hydrostatic pressure and a portion of said signal indicative of acoustical pressure variations.

8. A pressure transducer system for detecting subaqueous ambient pressure changes and seismic pressure wave variations, comprising: a fluid tight housing; transducer means in said housing; said transducer means including variable impedance devices in a circuit, said variable impedance devices having an associated movable means mounted on said housing; means for providing a carrier signal through said circuit; said movable means being arranged to move in response to pressure changes in the environment surrounding said transducer for varying the impedance of said impedance devices to modulate said carrier signal passing through said circuit in a manner indicative of such ambient and seismic pressure changes, said movable means being further arranged to produce cancelling variations in the impedance of said impedance devices in response to pressures caused by the motion of said housing in the surrounding medium; circuit means for balancing a measurable parameter of said signal to provide a nulled reference point from which to measure the ambient pressure of said medium surrounding said housing; and means for detecting and distinguishing between a portion of said signal indicative of ambient pressure and a portion of said signal indicative of seismic pressure wave variations.

9. A pressure transducer system comprising: pressure responsive means in said housing for modulating an electrical signal in a manner indicative of hydrostatic and seismic pressure changes in the medium surrounding said housing, means for rendering said modulated signal provided by said pressure responsive means substantially unaffected by pressures caused from the displacement, velocity, or acceleration of said housing in said medium, means for demodulating said signal, and means for separating the ambient and acoustical pressure information on said demodulated signal.

10. A pressure transducer system for detecting subaqueous ambient pressure changes and seismic pressure wave variations, comprising: a fluid tight housing, transducer means in said housing, said transducer means including variable impedance means in a circuit, said variable impedance means having an associated movable means mounted on said housing, means for providing a carrier signal through said circuit, said movable means being arranged to move in response to pressure changes in the environment surrounding said transducer for varying the impedance of said variable impedance means to modulates said carrier signal passing through said circuit in a manner indicative of such ambient and seismic pressure changes, and means for demodulating said signal to detect and distinguish between a portion of said signal indicative of ambient pressure and a portion of said signal indicative of seismic pressure wave variations.

References Cited by the Examiner
UNITED STATES PATENTS

| | | | |
|---|---|---|---|
| 2,043,416 | 6/1936 | Lueg. | |
| 2,465,696 | 3/1949 | Paslay | 340—7 X |
| 2,583,941 | 1/1952 | Gordon | 73—398 X |
| 2,915,738 | 12/1959 | Vogel | 340—17 |
| 3,013,233 | 12/1961 | Bourns. | |

References Cited by the Applicant
UNITED STATES PATENTS 3,187,300    6/1965    Brate.

BENJAMIN A. BORCHELT, *Primary Examiner.*

P. A. SHANLEY, *Assistant Examiner.*